(No Model.) 4 Sheets—Sheet 1.
P. NACEY.
WEED MOWING HAND CAR.
No. 420,825. Patented Feb. 4, 1890.
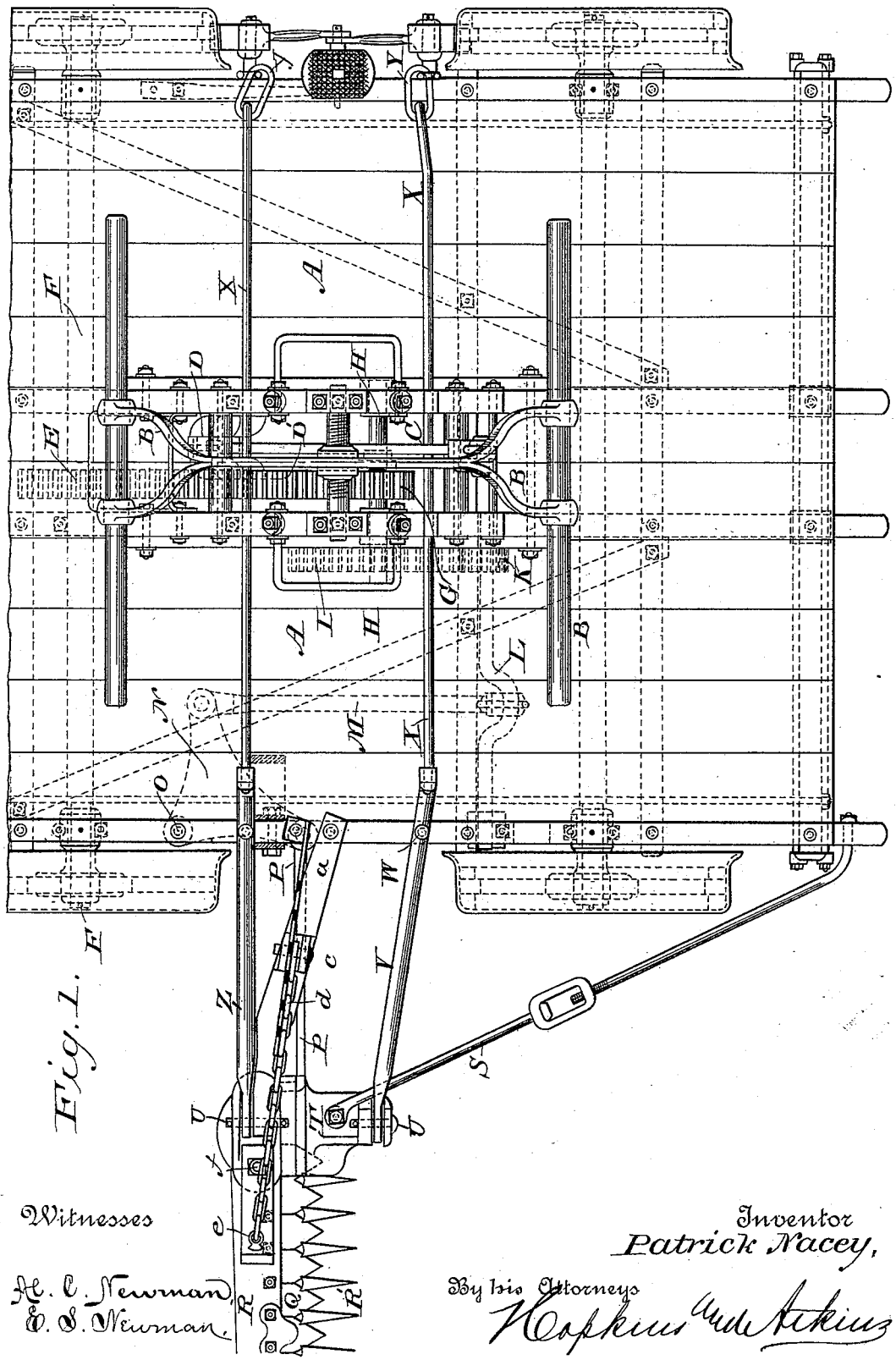

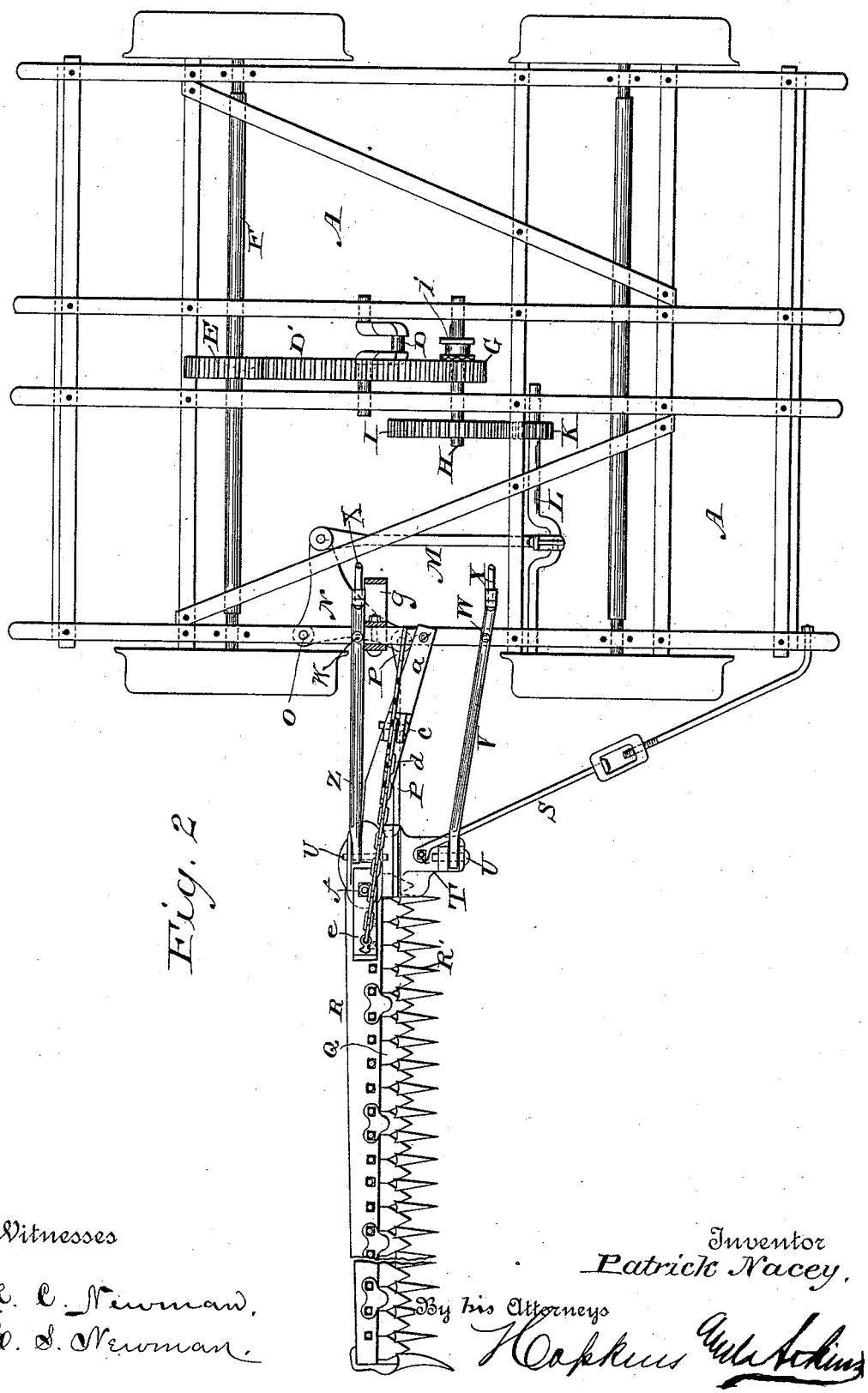

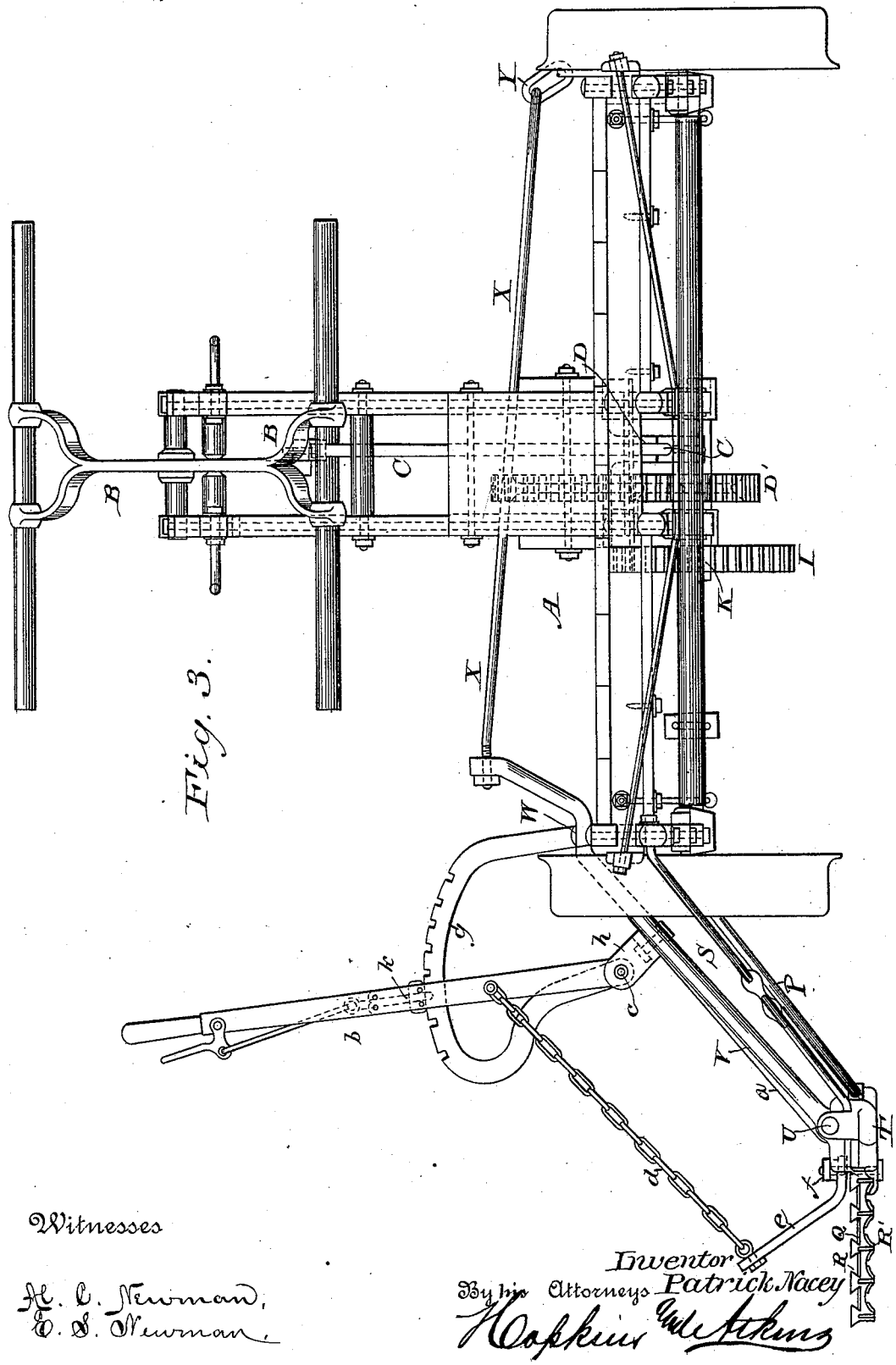

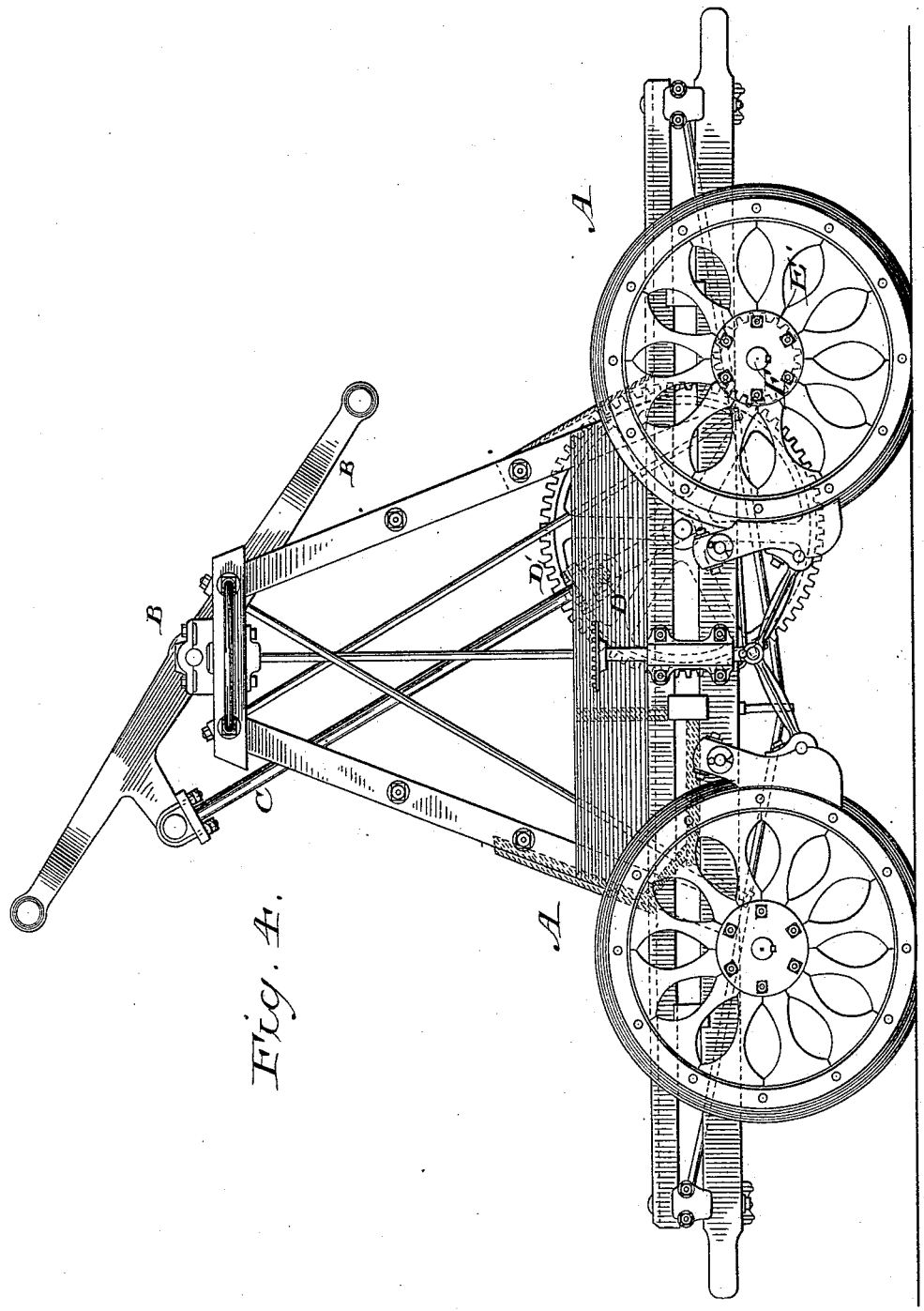

UNITED STATES PATENT OFFICE.

PATRICK NACEY, OF GRACEVILLE, MINNESOTA, ASSIGNOR OF ONE-HALF TO THE SHEFFIELD VELOCIPEDE CAR COMPANY, OF THREE RIVERS, MICHIGAN.

WEED-MOWING HAND-CAR.

SPECIFICATION forming part of Letters Patent No. 420,825, dated February 4, 1890.

Application filed March 13, 1889. Serial No. 303,142. (No model.)

*To all whom it may concern:*

Be it known that I, PATRICK NACEY, of Graceville, in the county of Big Stone and State of Minnesota, have invented a certain new and useful Weed-Mowing Hand-Car, of which the following is a specification, reference being had to the accompanying drawings.

The object of my invention is to produce a hand-car adapted for ordinary use as such, and also to receive and operate a detachable mowing attachment to mow weeds and grass along the sides of a railroad-track.

In many sections of the country where the soil is fertile, and especially upon prairies, where the road-beds are generally nearly level with the land on either side, exceedingly rapid growths of vegetation occur during the summer-time and require frequent mowing at great expense. Such growths are liable to be blown over upon the tracks by strong winds and to obstruct travel; and, again, they are liable, as soon as they become partially dry, to get on fire and cause the burning of ties, bridges, fences, &c., doing great damage to railroad property. My invention is designed to produce a machine which will remove such growths with great rapidity and economy, and which is adapted to be converted into an ordinary hand-car and used as such.

Accordingly my invention consists in the peculiar organization hereinafter described and claimed, by which I combine a mowing attachment operatively with a hand-car so as to be capable of the movements and adjustments necessary to operate for the purpose stated, and also to be capable of being detached at will.

In the accompanying drawings, Figure 1 is a plan view of a hand-car with my improvements applied. Fig. 2 is another plan view with the walking-beam and handles of the car removed. Fig. 3 is an end elevation of a hand-car with my improvements applied. Fig. 4 is a side elevation of a hand-car, showing the side opposite to that upon which the mowing mechanism is attached.

Referring to the letters upon the drawings, A indicates a railway hand-car of ordinary construction adapted to have applied to it upon one side a mowing attachment. B indicates the walking-beam and handles; C, a pitman pivotally connecting the walking-beam with the crank D of the driving-wheel D', geared with the wheel E upon the axle F, by means of which parts the car is propelled in the usual way.

In order to carry out my invention it is first necessary to apply a mowing attachment on one side of the car, project it outward and downward a suitable distance, and support it firmly there in proper position for work. Then it is necessary next to provide suitable mechanism to connect it operatively with the car-driving mechanism just described, and this connecting mechanism must be disposed between the car-driving mechanism and the mowing attachment, and be adapted to run easily and to convert the rotary motion of the car-driving mechanism into the reciprocating motion necessary to operate the cutter-bar of the mowing attachment. Accordingly I have devised such supporting mechanism and such operating connecting mechanism. Furthermore, I have provided for detaching the mowing mechanism whenever desired, so that the car can be used for ordinary purposes; and I have also provided for throwing the mowing mechanism out of gear whenever desired, so that it shall not operate. Of course the projecting or overhanging parts must be made strong enough to do the work, but at the same time light enough to avoid danger of tipping the car over and to avoid the necessity of weighting the car on the opposite side.

Referring now to the peculiar mechanism constituting the embodiment of my invention as illustrated, G indicates a wheel upon a shaft H, which gears with the wheel D'. I is another wheel upon the shaft H, which gears with a wheel K on the crank-shaft L.

M is a rod pivotally connecting the crank-shaft with a bell-crank lever N, pivoted at O.

P is a link pivoted at one end to the bell-crank lever and at the other to the cutter-bar Q, which reciprocates in the finger-bar R, of usual construction.

R' indicates the guard-fingers.

S is an adjustable brace-rod secured at one end to the forward part of the car-frame and at the other to the shoe T, upon which the finger-bar is pivoted, as shown at U U.

V indicates a supporting-bar for the shoe, bolted to the frame at W and provided with a rod X extending across the car and connected by a fastening-link Y to the car-frame. Z indicates another supporting-bar, similarly arranged and connected.

$a$ indicates a bar secured at one end to the frame of the car and at the other end to the shoe, whose office is to support the hand-lever $b$, pivoted at $c$.

$d$ indicates a chain extending from the hand-lever to an angle-bar or projection $e$, bolted to the finger-bar at $f$.

$g$ indicates a ratchet or rack-bar secured at one end to the car-frame and at the other to the standard $h$, supported upon the bar $a$.

By means of the hand-lever the finger-bar can be turned on its pivot so as to be thrown up out of position for use, held by the spring-latch $k$, and let down to place for cutting, as is usual in mowing-machines.

In order to throw the mowing mechanism out of gear whenever desired, I provide a clutch mechanism at $i$, of any ordinary character, by means of which the wheel G, which is normally loose on its shaft, may be clutched thereto, so as to drive the mowing mechanism. This mowing mechanism is applied by means of bolts and nuts, so that the main parts can be readily detached from the car, leaving it free for ordinary service.

The shoe should preferably be projected out beyond the ends of the ties, and should be adjusted to cut at least as low as the tops of the ties.

I thus provide a hand-car adapted to be run along a track in the usual manner and operate a mowing attachment to cut grass or weeds for a distance of several feet from the track.

Of course the means here shown and described for converting the rotary motion for driving the car, caused by the operation of the walking-beam, into reciprocating motion necessary to operate the cutter-bar might be varied in detail considerably without departing from the substance of my invention, and so might the car-driving mechanism located on the car.

What I claim is—

1. The combination, with the driving mechanism of a hand-car located thereon, of a mowing attachment secured to one side of the car, and gearing connecting said driving mechanism and the cutter-bar of the mowing attachment and adapted to convert the rotary motion of the driving mechanism into reciprocating motion to operate the cutter-bar, substantially as set forth.

2. The combination of a car adapted to run on a railway-track, driving mechanism for the same located on the car, and a mowing mechanism attached detachably to one side of the car and connected operatively with the car-driving mechanism, substantially as set forth.

In testimony of all which I have hereunto subscribed my name.

PATRICK NACEY.

Witnesses:
ANDREW MONAN,
T. J. ROACH.